United States Patent
He et al.

(10) Patent No.: US 12,417,415 B2
(45) Date of Patent: *Sep. 16, 2025

(54) METHOD AND DEVICE FOR CONTROLLING A TRANSPORT SYSTEM

(71) Applicant: GRABTAXI HOLDINGS PTE. LTD., Singapore (SG)

(72) Inventors: Donghan He, Singapore (SG); Renrong Weng, Singapore (SG); Chongyu Zhou, Singapore (SG); Ruike Zhang, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/762,004

(22) Filed: Jul. 2, 2024

(65) Prior Publication Data

US 2024/0354665 A1 Oct. 24, 2024

Related U.S. Application Data (63) Continuation of application No. 18/256,659, filed as application No. PCT/SG2022/050059 on Feb. 7, 2022.

(30) Foreign Application Priority Data

Mar. 2, 2021 (SG) .................. 10202102129P (51) Int. Cl.
  *G06Q 50/47* (2024.01)
  *G06N 3/091* (2023.01)
  *G06Q 10/02* (2012.01)

(52) U.S. Cl.
  CPC .......... *G06Q 10/025* (2013.01); *G06N 3/091* (2023.01); *G06Q 50/47* (2024.01)

(58) Field of Classification Search
  CPC ...... G06Q 10/02–10/025; G06Q 50/40–50/47; G06Q 50/224
  See application file for complete search history.

(56) References Cited

U.S. PATENT DOCUMENTS

| 2014/0052421 A1 | 2/2014 | Allen et al. |
| 2016/0162478 A1 | 6/2016 | Blassin et al. |

(Continued)

FOREIGN PATENT DOCUMENTS

| CN | 109272175 A | 1/2019 |

OTHER PUBLICATIONS

Chen, et al., Trip2Vec: a deep embedding approach for clustering and profiling taxi trip purposes, Personal and Ubiquitous Computing, vol. 23, 2019, pp. 53-66 (Year: 2019).*

(Continued)

*Primary Examiner* — Daniel Vetter
(74) *Attorney, Agent, or Firm* — Buckley, Maschoff & Talwalkar LLC (57) ABSTRACT

Aspects concern a method for controlling a transport system comprising determining historical data of a multiplicity of transport trips performed by the transport system, training a neural network to perform an invertible mapping of transport trips to latent representations to fulfil, by the distribution of the latent representations of the multiplicity of transport trips, a predetermined fitting criterion with respect to a predetermined latent representation base distribution, sampling a multiplicity of latent representations from the base distribution, mapping each of the sampled latent representations to a respective transport trip by using the trained neural network to perform the inverse of the invertible mapping to generate a multiplicity of synthetic transport trips, determining a control scheme for the transport system using the multiplicity of synthetic transport trips and controlling the transport system using the determined control scheme.

21 Claims, 6 Drawing Sheets

(56) References Cited

U.S. PATENT DOCUMENTS

| | | | |
|---|---|---|---|
| 2020/0218999 A1* | 7/2020 | Eleftheriadis | G06Q 50/40 |
| 2020/0241564 A1 | 7/2020 | Goldman | |
| 2020/0333795 A1 | 10/2020 | Jang | |
| 2021/0027896 A1 | 1/2021 | Eun et al. | |
| 2022/0051283 A1 | 2/2022 | Chen et al. | |
| 2022/0108339 A1 | 4/2022 | Tan et al. | |
| 2022/0164720 A1 | 5/2022 | Balachandran et al. | |
| 2022/0319312 A1 | 10/2022 | Mintz | |

OTHER PUBLICATIONS

Veres, et, al., Deep learning for intelligent transportation systems: A survey of emerging trends, IEEE Transactions on Intelligent transportation systems vol. 21 No. 8, 2019, pp. 3152-3168 (Year: 2019).*

International Search Report and Written Opinion dated Apr. 15, 2022 which was issued in connection with PCT/SG2022/050059.

Li X. et al., A Data-Driven Dynamic S1ochas1ic Programming Framework for Ride-Sharing Rebalancing Problem under Demand Uncertainty. 2020 IEEE International Conference on Parallel & Distributed Processing with Applications, Big Data & Cloud Computing, Sustainable Computing & Communications, Social Computing & Networking, Dec. 19, 2020, pp. 1120-1125 [Retrieved on Apr. 14, 2022) <DOI: 10.1109/ISPA-BDCLOUD-Socialcom-Su STAINCOM51426.2020.00167> sections 1, 2, 2.1, 3, 4.1, 4.2.

Xu J. et al , Real-time Prediction of Taxi Demand Using Recurrent Neural Networks. IEEE Transactions on Intelligent Transportation Systems, Oct. 25, 2017, vol. 19, No. 8, pp. 2572-2581 [Retrieved on Apr. 14, 2022) <DOI: 10.1109/TITS.2017 .2755684> sections 1, III.A, 111.B. IV, IV.A, IV.B. IV.C, equation 4, figure 6.

Holm M.E. et al., Utilizing Mixture Density Networks for Travel Time Probability Distribution Predictions. Aalborg University, Jun. 12, 2020, pp. 1-21 [Retrieved on Apr. 14, 2022).

Information Disclosure Statement dated Aug. 5, 2023 which was filed in connection with U.S. Appl. No. 18/256,659.

Papamakarios et al: "Normalizing Flows for Probabilistic Modeling and Inference", Dec. 2019, 60 pages.

"Keras-Normalizing-Flov,-s" Apr. 2019 https:1/github .comicserpell/keras-normalizing-flows/blobimaster/flows. py, 3 pages.

Lu et al.: "Structured Output Leaming , vith Conditional Generative Flows", Feb. 2020, 12 pages.

Papamakarios et al.: "Masked Autoregressive Flovv for Density Estimation", 2017, 10 pages.

Atanovet. al.: Semi-Conditional Normalizing Flov,-s for Semi-Supervised Leaming:, Jun. 2020, 9 pages.

Simon Bohm: "Conditional Density Estimation with Normalizing Flows", Aug. 2019, 52 pages.

Louis Tiao: "Implementing Variational Autoencoders in Keras: Beyond the Quickstart Tutorial", Oct. 2017, 20 pages.

Zalando Research: "Forecasting Time-Series and Their Interactions", 2020, 8 pages.

892 Form with was received in connection with U.S. Appl. No. 18/256,659.

Chen, et al., Understanding ridesplitting behavior of on-demand ride services: An ensemble learning approach, Transportation Research Part C, vol. 76, 2017, pp. 51-70 (Year: 2017).

Veres, et al., Deep Learning for Intelligent Transportation Systems: A Survey of Emerging Trends, IEEE Transactions On Intelligent Transportation Systems, vol. 21, No. 8, Aug. 2020, pp. 3152-3168 (Year: 2020).

Notice of Allowance dated Jun. 17, 2024 which was received in with connection with U.S. Appl. No. 18/256,659.

* cited by examiner

METHOD AND DEVICE FOR CONTROLLING A TRANSPORT SYSTEM

CROSS REFERENCE

The present invention is a continuation of U.S. patent application Ser. No. 18/256,659 which in entitled METHOD AND DEVICE FOR CONTROLLING A TRANSPORT SYSTEM and which was filed on Jun. 9, 2023, which is a 371 of International Application No. PCT/SG2022/050059, filed on Feb. 7, 2022, and claiming priority to Singapore application Ser. No. 10/202,102129P filed on Mar. 2, 2021, incorporated by reference herein in its entirety.

TECHNICAL FIELD

Various aspects of this disclosure relate to methods and devices for controlling a transport system.

BACKGROUND

A transport system providing a transport service is a complex system with many parameters which cannot be easily predicted by the operator of the transport system. For example, in an e-hailing service which enables customers to hail transport vehicles (i.e. taxis) using their smartphones the operation of the transport system needs to be adapted to the trips the customer take, e.g. how long the trips are, in what directions the customers want to go at what times (e.g. early evening into the city, late evening back from the city), in what regions most trips are booked etc. It is desirable to have knowledge of such parameters at least approximately in advance. For example, it should be known in what regions to expect high demand at a certain time of the day to be able to distribute transport vehicles to such regions in advance. An approach is to gather historical data over time, i.e. record the trips taken by customers and thus, over time of operation of the transport system, build up a data base based on which the transport system may be controlled. However, such a data base may hold too little data, in particular at the beginning of the operation of a transport system, to allow reliable control. In fact, since customer behaviour may change over time, it may even occur that the data base never reaches a sufficient amount of information that is up to date to allow reliable control. Accordingly, approaches that allow a more reliable control of a transport system are desirable.

SUMMARY

Various embodiments concern a method for controlling a transport system comprising determining historical data of a multiplicity of transport trips performed by the transport system, training a neural network to perform an invertible mapping of transport trips to latent representations to fulfil, by the distribution of the latent representations of the multiplicity of transport trips, a predetermined fitting criterion with respect to a predetermined latent representation base distribution, sampling a multiplicity of latent representations from the base distribution, mapping each of the sampled latent representations to a respective transport trip by using the trained neural network to perform the inverse of the invertible mapping to generate a multiplicity of synthetic transport trips, determining a control scheme for the transport system using the multiplicity of synthetic transport trips and controlling the transport system using the determined control scheme.

According to various embodiments, the neural network is configured such that the mapping comprises a trainable function and the inverse of the mapping comprises the trainable function.

According to various embodiments, the predetermined fitting criterion is a maximum likelihood criterion.

According to various embodiments, training the neural network comprises a maximization of a sum of probability density values of the latent representations of the multiplicity of transport trips by adjusting weights of the neural network.

According to various embodiments, training the neural network comprises adjusting the weights by gradient descent.

According to various embodiments, training the neural network comprises adjusting weights of the neural network to increase the likelihood that a sampling of latent vectors from the base distribution and mapping the latent vectors to transport trips by the inverse of the invertible mapping generates the multiplicity of transport trips of the historical data.

According to various embodiments, the base distribution is a multidimensional distribution.

According to various embodiments, each latent representation is a latent vector having values for a plurality of vector components, wherein the values of each vector component are distributed according to the multidimensional distribution.

According to various embodiments, the base distribution is a mixture of distributions.

According to various embodiments, the base distribution is a multidimensional Gaussian distribution or a multidimensional uniform distribution.

According to various embodiments, determining the historical data comprises determining a data point in a data point space for each transport trip of the multiplicity of transport trips.

According to various embodiments, mapping each of the sampled latent vectors to a respective transport trip comprises mapping the sampled latent vector to a data point in data point space.

According to various embodiments, the base distribution depends on a parameter and sampling a latent representation from the base distribution comprises sampling a latent representation from the base distribution with the parameter set to a value for which a synthetic transport trip is to be generated.

According to various embodiments, the parameter specifies a trip characteristic.

According to various embodiments, the historical data comprises a value for the parameter for each of the multiplicity of transport trips.

According to various embodiments, determining the control scheme comprises training a control policy using the multiplicity of synthetic transport trips.

According to various embodiments, the method comprises training the control policy using reinforcement learning.

According to various embodiments, training the control policy comprises a reinforcement learning agent interacting with a reinforcement learning environment comprising the multiplicity of synthetic transport trips.

According to various embodiments, determining the control scheme comprises evaluating one or more predetermined control schemes using the multiplicity of synthetic transport trips.

According to various embodiments, the transport system is configured to provide a transport service in a geographic region and controlling the transport system comprises controlling supply in the geographic region.

According to various embodiments, controlling the transport system comprises controlling one or more vehicles to move from a sub-region of the geographic region to another sub-region of the geographic region.

According to various embodiments, a server computer including a communication interface, a memory and a processing unit configured to perform the method of any one of the above embodiments is provided.

According to one embodiment a computer program element is provided including program instructions, which, when executed by one or more processors, cause the one or more processors to perform the method of any one of the above embodiments.

According to one embodiment a computer-readable medium is provided including program instructions, which, when executed by one or more processors, cause the one or more processors to perform the method of any one of the above embodiments.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the devices or methods are analogously valid for the other devices or methods. Similarly, embodiments described in the context of a device are analogously valid for a vehicle or a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

In the following, embodiments will be described in detail.

An e-hailing app, typically used on a smartphone, allows its user to hail a taxi (or also a private driver) through his or her smartphone for a trip.

Figure 1:
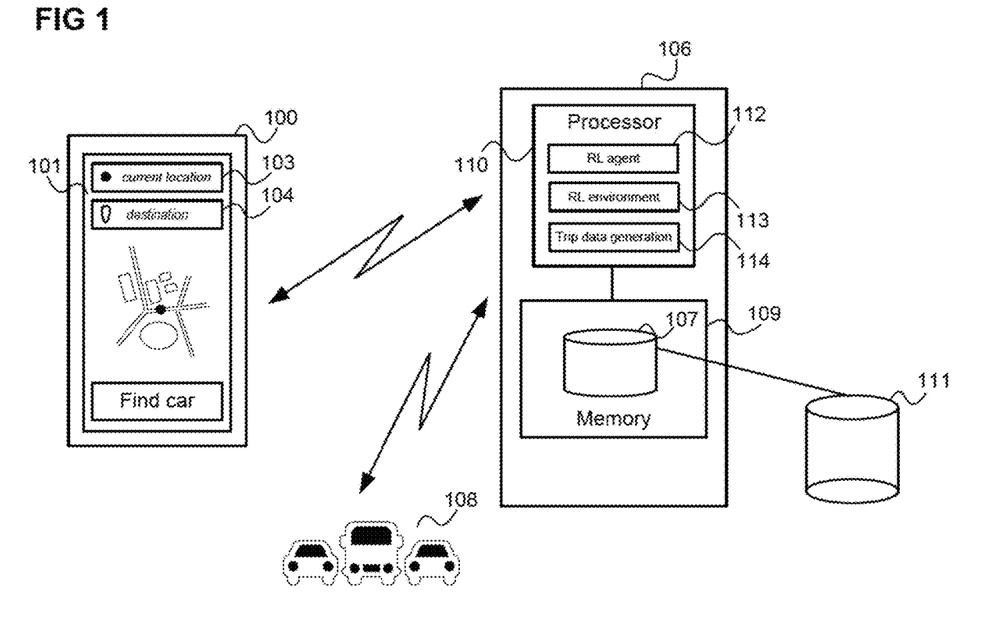
FIG. 1 shows a communication arrangement including a smartphone and a server.

FIG. 1 shows a communication arrangement including a smartphone 100 and a server (computer) 106.

The smartphone 100 has a screen showing the graphical user interface (GUI) of an e-hailing app that the smartphone's user has previously installed on his smartphone and has opened (i.e. started) to e-hail a ride (taxi or private driver).

The GUI 101 includes a map 102 of the user's vicinity (which the app may determine based on a location service, e.g. a GPS-based location service). Further, the GUI 101 includes a box for point of departure 103 (which may be set to the user's present location obtained from location service) and a box for destination 104 which the user may touch to enter a destination (e.g. opening a list of possible destinations). There may also be a menu (not shown) allowing the user to select various options, e.g. how to pay (cash, credit card, credit balance of the e-hailing service). When the user has selected a destination and made any necessary option selections, he or she may touch a "find car" button 105 to initiate searching of a suitable car.

For this, the e-hailing app communicates with the server 106 of the e-hailing service via a radio connection. The server 106 includes a database 107 having information about the current location of registered vehicles 108 (i.e. vehicles which form the supply of the transport service), about when they are expected to be free, about traffic jams etc. From this, a processor 110 of the server 106 selects the most suitable vehicle (if available, i.e. if the request can be fulfilled) and provides an estimate of the time when the driver will be there to pick up the user, a price of the ride and how long it will take to get to the destination. The server communicates this back to the smartphone 100 and the smartphone 100 displays this information on the GUI 101. The user may then accept (i.e. book) by touching a corresponding button. If the user accepts, the server 106 informs the selected vehicle 108 (or, equivalently, its driver), i.e. the vehicle the server 106 has allocated for fulfilling the transport request.

It should be noted that while the server 106 is described as a single server, its functionality, e.g. for providing an e-hailing service for a whole city, will in practical application typically be provided by an arrangement of multiple server computers (e.g. implementing a cloud service). Accordingly, the functionality described in the following provided by the server 106 may be understood to be provided by an arrangement of servers or server computers.

Whether a request by the smartphone 100 for a transport can be fulfilled depends largely on whether a vehicle of the e-hailing service is sufficiently near, i.e. whether the area in which the user is located is sufficiently supplied with vehicles of the e-hailing service (or more generally transport service).

The trips customers are booking cannot be easily predicted. Moreover, the demand of customers for trips is typically different for different times of the day and different seasons and may also change over time (for example, a quarter of a city may become unpopular such that trips to that quarter of the city and within the quarter of the city at night decrease over time). However, for control of the transport system, e.g. for steering supply of transport vehicles in various regions of a city, it is important to have (approximate) knowledge about the trips (i.e. demand, the length of the trips, starting locations, destinations etc.) For example, it is of high importance for an operator to be able to satisfy demand (i.e. to maintain fulfilment rate (FR)) since otherwise customers may be lost.

For example, the server 106 (which may also be a server arrangement) acts as transport system controller of the transport system. When a transport system controller, e.g. server 106, has knowledge about the trips, it can set control parameters accordingly, e.g. perform supply shaping (by controlling vehicles to go to regions with high expected demand), and demand shaping using, e.g. dynamic incentives for drivers and/or customers (such as by adapting prices, e.g. having special offers to attract customers or increase prices to attract drivers).

According to various embodiments, synthetic trip data is provided which allows developing or testing control schemes for a transport system. A transport system controller may for example learn a control scheme by machine learning by reinforcement learning. For this, the transport system controller (e.g. the processor 110 of server 106) may implement a reinforcement learning framework comprising a reinforcement learning (RL) agent 112 and an environment 113 that the RL agent 112 can interact with. According to various embodiments, the server 106 implements a trip data generation model 114 to generate synthetic trip data to build the environment 113 by simulation by the trip data generation model 114. For example, the transport system controller may sample a (simulated) trip with creation time, pick-up and drop-off coordinates, distance and fare etc. and have the RL agent 112 interact with the sampled trip.

According to various embodiments, approaches are provided that ensure that the sampling statistics follow the distribution extracted from historical data, which could be any arbitrary distribution. Thus, reliable control can be achieved.

Rather than building the environment by simulation, it is also conceivable that the transport system controller (e.g. for RL learning) directly samples the historical trip data, e.g. recorded in data base 107. However, it would take a high amount of memory 109 which is fast accessible to store the historical data, because it is needed on the fly for the sampling. Further, using only historical data does not allow extrapolating onto unseen data points (i.e. the coverage of the historical data of all possible trips may be insufficient), or the historical data might contain falsely recorded data points (i.e. trips).

Another approach would be to fit historical data with the most similar individual probability distribution, like a Gaussian, Beta, or Gamma distribution, etc. However, this approach needs domain knowledge so that the respective probability distribution can be tailored to the data (e.g. per feature). Furthermore, even in case an expert can provide domain knowledge, it can typically not be generalized across markets, meaning this approach is not scalable. Additionally, the fitting accuracy is an issue with this approach. In particular, human evaluation incurs its own biases.

To achieve higher fitting accuracy, a mixture density neural network may be used (e.g. a deep mixture of gaussians network). A Gaussian mixture distribution can approximate any arbitrary distributions in theory (with a high enough number of mixture components). However, regardless of the composed density (e.g. the Gaussians), the density function itself is still simple and smooth, which cannot adapt to the irregular supports and unsmooth density that real life problems typically exhibit. For example, trips have boundaries related to them (city boundaries, impassable regions etc.), which means the support of their distribution is irregular. However, Gaussian distributions are supported on the entire real plane. This means that when fitted, Gaussian distributions are typically fitted around these boundaries with small variances, and the fitted density function assigns small probabilities to invalid points. When sampling, there is the risk of drawing invalidate points so a mechanism like rejection sampling on the sampled points to discard invalid samples needs to be implement if that risk should be avoided. Complicated rejection sampling rules to achieve this may however lead to inefficiency (i.e. most of the samples being rejected). In fact, the majority of the samples drawn may be problematic, and might need to be rejected to reliably train the reinforcement learning agent 112.

According to various embodiments, a normalizing flow model is used as trip data generation model 114.

The main difference between normalizing flow models and other deep generative models is that normalizing flows can create density functions of arbitrary shapes. A normalizing flow model achieves this by altering a simple base distribution such as a Gaussian distribution directly and gradually. This can be visualized like morphing a 3-D mud ball into a complicated 3-D object like a monkey. Fitting a normalizing flow model is equivalent to finding a way to smoothly transform the mud ball into the monkey (and vice versa).

Figure 2:
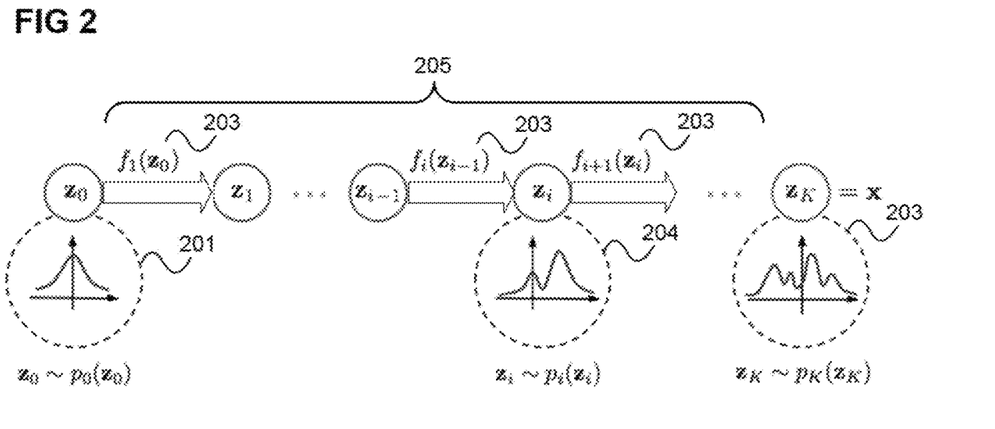
FIG. 2 illustrates the determination of a complicated probability distribution from a simple base distribution.

FIG. 2 illustrates the determination of a complicated probability distribution 202 (which fits complicated data) from a simple base distribution 201.

The distributions are shown in terms of their density functions. The base distribution is for example a Gaussian.

A set of samples (20) drawn from a Gaussian distribution 201 is geometrically ball shaped. After i normalizing flow transformations 203 (similarly to the mud ball in the mud ball-monkey example) the ball can be seen to be kneaded and stretched, and can (corresponding to the resulting intermediate distributions 204) become more and more complicated. Eventually, after K transformations 203, the resulting distribution 202 is highly complicated. Each transformation 203 is mathematically smooth and invertible such that the composition 205 of all transformations can be fully inverted (i.e. undone). In the visualization above, this means that it is possible to recover the mud ball from the monkey and you can pinpoint in the mud ball which granular of mud is transformed into a certain hair on the monkey's body. Mathematically, this means that it is possible to sample a $z_0$ from the base distribution 201 such as a Multivariate Gaussian Distribution, and generate a highly realistic data point $z_K$ by transforming the sample $z_0$ by means of the transformation composition 205. If the ith transformation is denoted by $f_i$ with i=1 to K the composition is given by $$f = f_1 \circ f_2 \circ \ldots \circ f_K.$$

Normalizing flows models fitted out of the box can improve the validity of the trip samples generated by the trip data generation. The reason why this is the case is that normalizing flow models can approximate distributions with complicated supports as well as irregular densities. Therefore, normalizing flow models are highly suitable for trip data generation. Specifically, for trip data generation, comparing the negative log likelihood objective function, normalizing flow-based models show drastic improvements over a mixture density network, even if the normalizing flow model is restricted to have less parameters than a well-tuned mixture density network. Further, normalizing flow models can abide to the geometric shape of the data much better than the mixture density network.

Beyond the synthetic data generation task, there are other potential areas that normalizing flow models can improve such as improving an RL agent's policies, and estimating uncertainty of prediction models. For example, normalizing flow models can be used to parametrize complicated and useful policies for reinforcement learning agents. Furthermore, for applications where uncertainty quantifications are important, variational inference is one of the few scalable approaches to do inference for Bayesian models, and normalizing flows are a fundamental building block for that.

In the following, examples for normalizing flow models (e.g. used by server 106 as trip data generation model 114 or at least as layer of the trip data generation model 114) are described with reference to FIG. 3 and FIG. 4.

The data points (from historical data in case of training and generated in case of sampling) are denoted by X (having components $X_1$ to $X_D$) and the samples of the base distribution (i.e. the values of the latent variable) are denoted by Z (having components $Z_1$ to $Z_D$). The base distribution is a base distribution for the latent variable values, or, in other words a latent representation (or latent value) base distribution.

The normalizing flow models may be trained by a forward pass (in a training phase) which transforms each data point X of training data (comprising a multiplicity of training data points, each corresponding to a trip) into a latent variable value Z and calculates necessary quantities to enable maximum likelihood training of a neural network implementing the transformation.

For sampling (i.e. generation of a simulated trip in a sampling phase) a value Z of the latent variable is sampled and the inverse of the trained transformation is used to generate a data point X from the latent variable value.

The normalizing flow models described provide multiple entry points for conditional information that can be leveraged to design highly complex and expressive conditional models. FIG. 3 shows a conditional affine coupling flow model 300.

The model 300 comprises a neural network 301 which implements the transformation and the inverse transformation between data point space and latent space. The latent variable follows a base distribution 302.

In the training phase, the server performs direct density fitting. In that case, for each D dimensional data point $[X_1, \ldots, X_D]$ of training data (e.g. coming from historical trip data) is split into two parts, $X'=[X_1, \ldots, X_d]$ and $X''=[X_{d+1}, \ldots, X_D]$ by a first partitioning layer 303. The two parts are then fed to the neural network 301. In the training phase, the neural network 301 implements the inverse of the transformation and performs the following: it first directly copies X' to Z', meaning the first part of the inverse transformation is just the identity. Further, the neural network calculates $Z''=\exp(NN(X'))*X''+NN(X')$, where NN(.) denotes a function learned in the training phase (starting for example from some random function based on random weights) by the neural network. The addition + and the multiplication * are to be understood as component-wise operations. The two latent variable parts Z' and Z" are then merged by a merging layer 304 to a complete value of the latent variable (i.e. a complete latent variable vector) for the input training data point.

This is done for all data points of the training data and the function NN (i.e. the neural network 301) is trained such that the distribution of latent variable values calculated fits the base distribution 302.

In the sampling phase, the model 300 performs, for a latent variable vector Z sampled from the base distribution 302, the inverse calculation of what it has done in the training phase: Given $Z=[Z_1, \ldots, Z_D]$, the model splits it into Z' and Z" by a second partitioning layer 305. Then the neural network 301 sets X' to Z' and calculates X" by $X''=(Z''-NN(Z'))/\exp(NN(Z'))$. Again, subtraction − and division/are to be understood as component-wise operations. The model 300 merges the calculated parts of the data point to a (synthetic) data point by means of a second merging layer 306.

So, the overall transformation (i.e. the mapping from the latent space to the data point (i.e. trip) space) comprises the function NN which is also part of the inverse of the transformation. As can be seen, the function NN does not necessarily need to be invertible but the overall mapping is invertible (both the mapping and its inverse contain the function NN). The function NN can be seen to be implemented by sub-neural network of the neural network 301.

Conditional information can be passed into the model in two ways: it can be used to parametrize the parameters of the underlying base distribution 302, or it can be passed into the neural network 301 as additional input. The conditional information may for example be time of the day, a geographic region etc. In case it is used as input to the neural network it is also fed to the neural network during training to ensure proper training of the function NN (e.g. a region-dependent training of NN). The training data points may be annotated with the conditional information accordingly (e.g. trip may be associated with a region or time).

Figure 4:
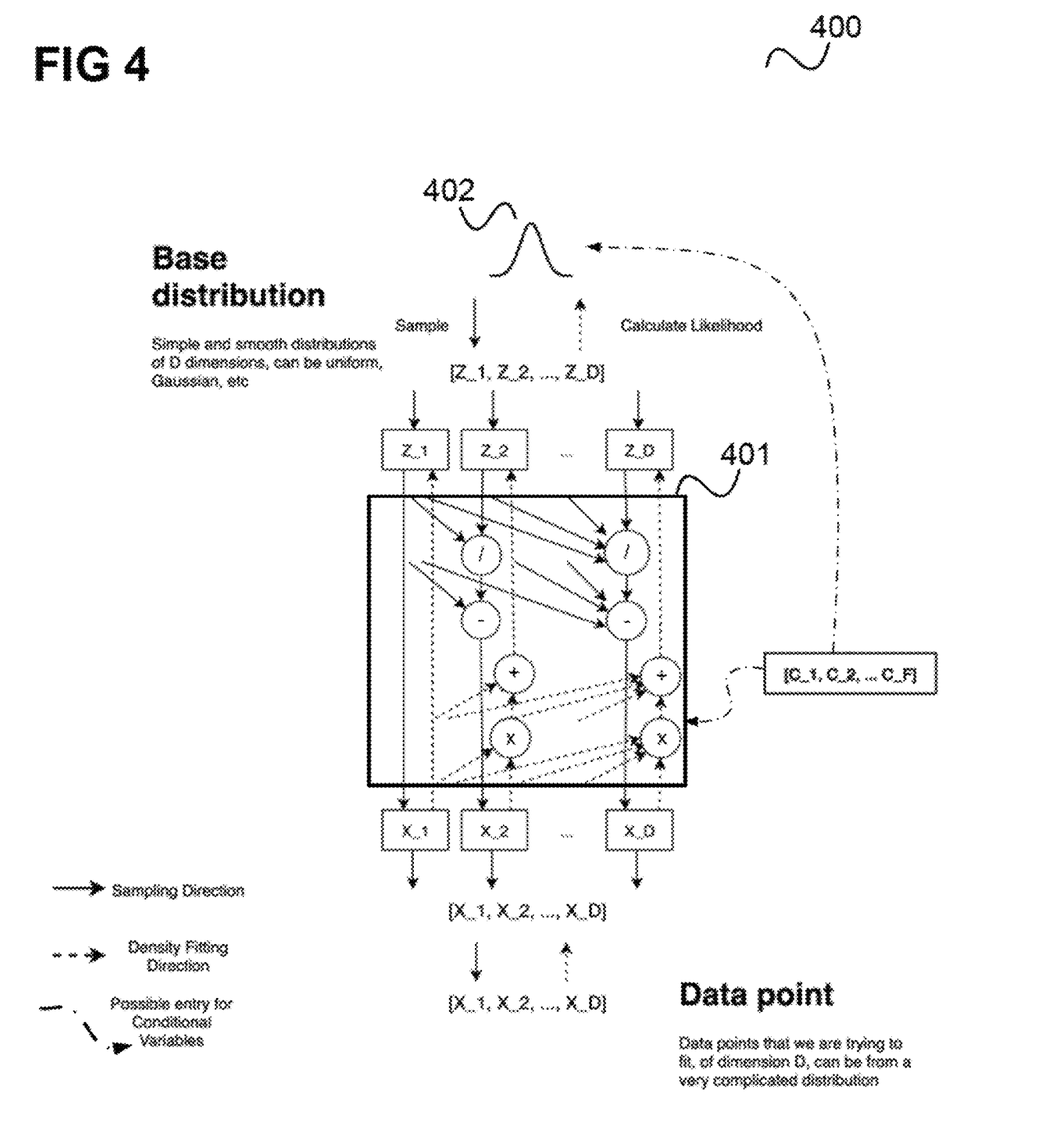
FIG. 4 shows a conditional masked autoregressive flow model.

FIG. 4 shows a conditional masked autoregressive flow model 400.

Figure 3:
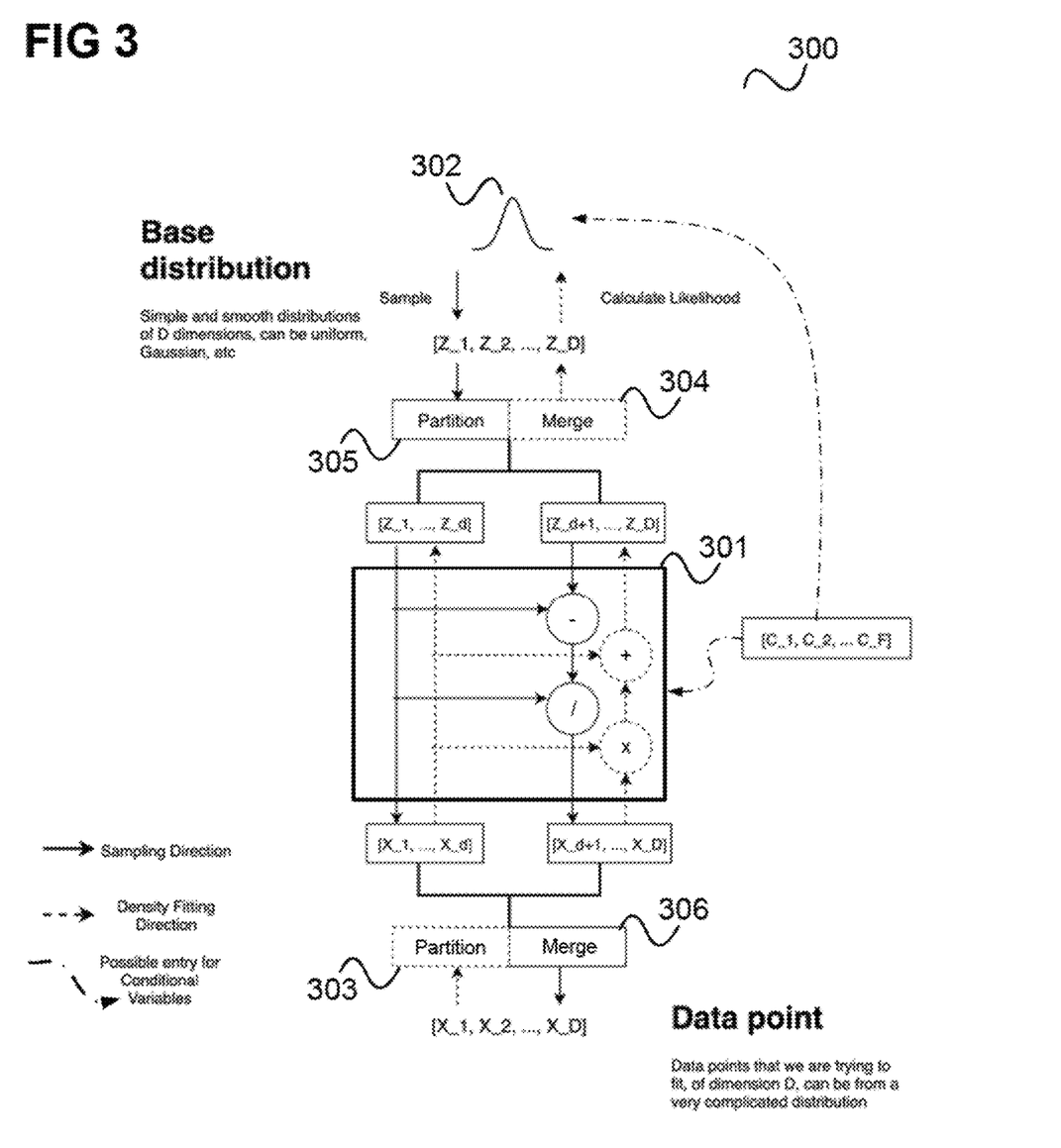
FIG. 3 shows a conditional affine coupling flow model.

The model 400 can be seen as a generalization of the model 300 of FIG. 3. Similarly to FIG. 3, the latent variable values (i.e. points of the latent space) follow a (D-dimensional) base distribution 402 and the model 400 comprises a neural network 401 implementing a transformation (top to bottom) and inverse transformation (bottom to top) between the latent variable space and the data point space.

In this example, in the training phase, for each D dimensional data point X the dth component of the latent variable vector is calculated as $Z_d=\exp(NN(X_{<d}))*X_d+NN(X_{<d})$, here $X_{<d}$ means a combination of all the $X_i$ with i<d, meaning a combination of all the components having an index lower than d (wherein $X_{<1}$ is set to 0). The combination may be a sum but may also be a weighted combination learnable by the neural network 401. The variables may be simply fed into the neural network by masking the full vector X with $[1, \ldots, 1, 0, \ldots, 0]$ (with 1 in the first d−1 unmasked positions). Then, the resulting vector $[X_1, \ldots, X_{d-1}, 0, \ldots, 0]$ is fed into the neural network. As in the example of FIG. 3, multiplication * and addition + are understood to be component-wise operations and NN is a function implemented by the neural network which is learned in the training phase.

In the sampling phase, the model 400 performs, for a latent variable vector Z sampled from the base distribution 402, the inverse calculation of what it has done in the training phase: Given $Z=[Z_1, \ldots, Z_D]$, the model calculates the components of the data point by $X_d=(Z_d-NN(Z_{<d}))/\exp(NN(Z_{<d}))$ wherein $Z_{<d}$ denotes the (possibly trainable) combination of all components of Z with index smaller than d. And once again, the conditional information can be passed in 2 ways, just as the same above.

Like in the example of FIG. 3, conditional information can be passed into the model by parametrizing the parameters of the underlying base distribution 402 by using it as additional input for the neural network 401.

The server 106 may fit the normalizing flow models (i.e. trip data generation model 114) to the available historical data using exact maximum likelihood estimation with gradient descent. This means that the normalizing flow model is trained such that the probability that the transformed base distribution outputs the training data is maximized.

In the examples of FIG. 3 and FIG. 4 this in particular involves learning the function NN.

Convergence monitoring may be implemented in straightforward manner. It should be noted that there is a trade-off between training performance and sampling performance if the data is extremely high dimensional. This means that for example either training may be made very fast or sampling (i.e. generation of samples x) may be made very fast. Anyway, in practice, only one aspect may be relevant.

The normalizing flow models 300, 400 may for example be implemented using Tensorflow (using the Tensorflow Probability library's bijector class) and Keras.

Figure 5:
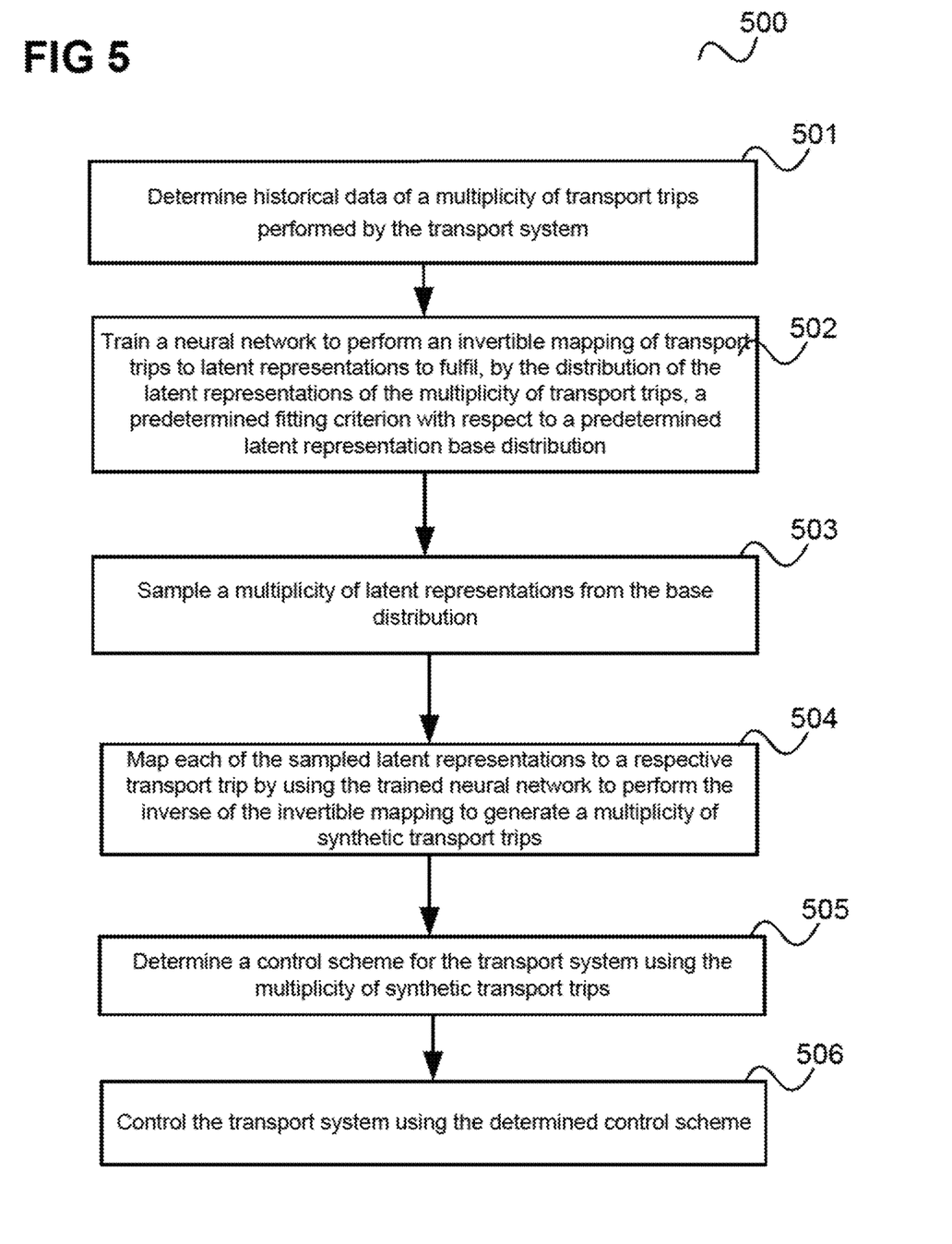
FIG. 5 shows a flow diagram illustrating a method for controlling a transport system according to an embodiment.

In summary, according to various embodiments, a method is provided as illustrated in FIG. 5.

FIG. 5 shows a flow diagram 500 illustrating a method for controlling a transport system.

In 501, historical data of a multiplicity of transport trips performed by the transport system are determined.

In 502, a neural network is trained to perform an invertible mapping of transport trips to latent representations to fulfil, by the distribution of the latent representations of the multiplicity of transport trips, a predetermined fitting criterion with respect to a predetermined latent representation base distribution.

In 503, a multiplicity of latent representations are sampled from the latent representation base distribution.

In 504, each of the sampled latent representations is mapped to a respective transport trip by using the trained neural network to perform the inverse of the invertible mapping to generate a multiplicity of synthetic transport trips.

In 505, a control scheme for the transport system is determined using the multiplicity of synthetic transport trips.

In 506, the transport system is controlled using the determined control scheme.

According to various embodiments, in other words, historical trip data is fit to a base distribution by training a transformation of a normalizing flow model. Synthetic trips are then generated by sampling from the base distribution and processing the samples by the inverse transformation. These synthetic trips are then used for controlling the transport system.

The method of controlling a transport system may be seen to include a method for simulating a transport system since the synthetic trips are simulations of trips that are similar to trips that actually occur in the transport system.

The method of controlling a transport system may be performed by means of a controlling entity like server 106, which may be configured to perform the method. It should be noted that the transport system may not only provide a transport service for transport of passengers (i.e. a taxi or e-hailing service) but may also be for transport of food and/or beverages (i.e. the transport service may be a food/beverage service) letters and parcels (i.e. may be a mail transport service) etc.

The method may for example comprise controlling supply of the transport system.

Supply is for example in units of transport vehicles and supply in a sub-area means the transport vehicles located in the sub-area in the time slot (or a certain reference time of the time slot, e.g. start time or centre time). Thus, supply in a sub-area in a time slot is for example a number of transport vehicles in the sub-area in the time slot (which are registered with the transport service and either idle or serving a request). Demand in a sub-area in a time slot for example means a number of requests for a ride originated in the sub-area during the time slot.

The method of FIG. 5 may be part of a method for controlling a fleet of vehicles.

The transport service vehicles may for example be autonomous vehicles. Controlling a vehicle to move to a sub-area or to move to a service area (to increase supply in the sub-area or service area) may thus for example mean instructing a vehicle controller of a vehicle to move to the sub-area or service area (without the need of a human user moving the vehicle to the sub-area or service area).

Figure 6:
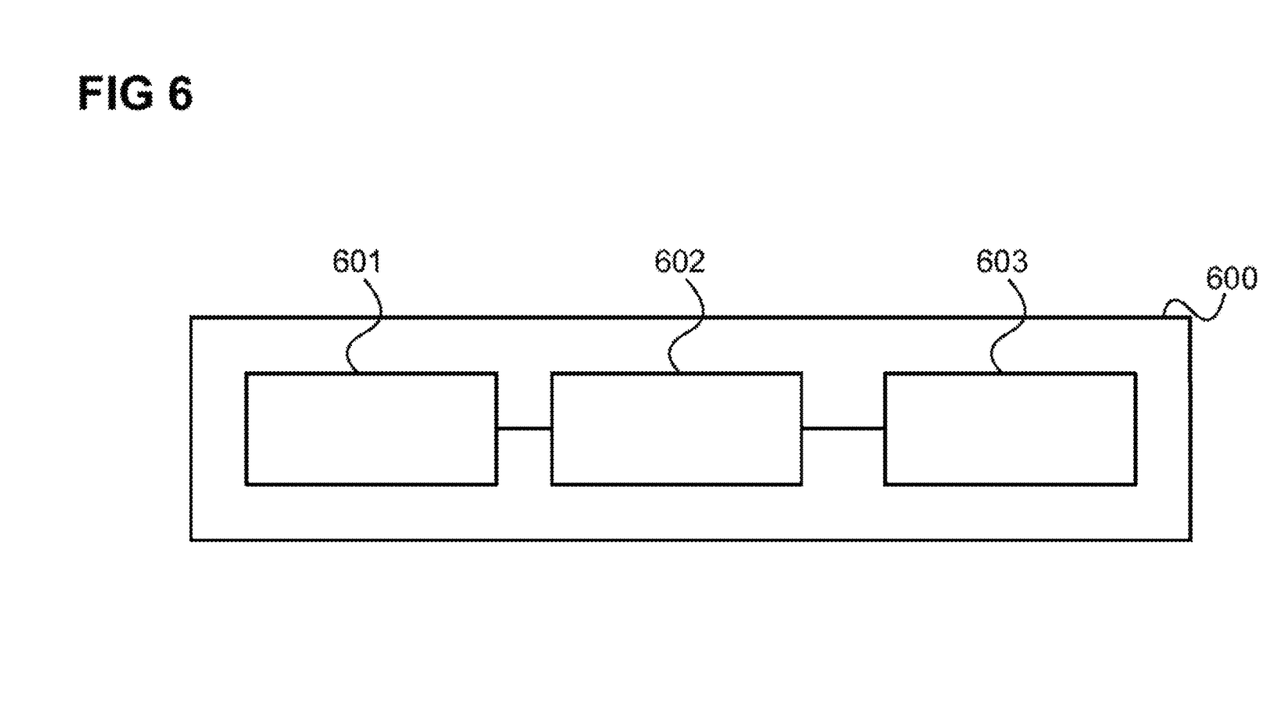
FIG. 6 shows a server computer according to an embodiment.

The method of FIG. 5 is for example carried out by a server computer as illustrated in FIG. 6.

FIG. 6 shows a server computer 600 according to an embodiment.

The server computer 600 includes a communication interface 601 (e.g. configured to receive historical (trip) data). The server computer 600 further includes a processing unit 602 and a memory 603. The memory 603 may be used by the processing unit 602 to store, for example, data to be processed as well as a specification of the neural network. The server computer is configured to perform the method of FIG. 5.

The methods described herein may be performed and the various processing or computation units and devices described herein may be implemented by one or more circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor. A "circuit" may also be software being implemented or executed by a processor, e.g. any kind of computer program, e.g. a computer program using a virtual machine code. Any other kind of implementation of the respective functions which are described herein may also be understood as a "circuit" in accordance with an alternative embodiment.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method, comprising:
   determining an input dataset of historical data associated with transport trips performed by a transport system;
   identifying a predetermined latent representation base distribution of the input dataset;

sampling a set of latent representations from the predetermined latent representation base distribution;

inputting the set of sampled latent representations into a neural network to generate a corresponding set of synthetic transport trips by performing the inverse mapping from the latent representations to transport trips;

determining a control scheme for the transport system using the set of synthetic transport trips; and controlling the transport system using the determined control scheme.

2. The method of claim 1, wherein the neural network is trained to map transport trips to latent representations and back, ensuring the latent representations of historical data meet a predetermined fitting criterion against the predetermined latent representation base distribution.

3. The method of claim 1, wherein the neural network is configured such that the mapping comprises a trainable function and the inverse of the mapping comprises the trainable function.

4. The method of claim 2, wherein the predetermined fitting criterion is a maximum likelihood criterion.

5. The method of claim 2, wherein training the neural network comprises a maximization of a sum of probability density values of the latent representations of the transport trips of the input dataset by adjusting weights of the neural network.

6. The method of claim 4, wherein training the neural network comprises adjusting the weights by gradient descent.

7. The method of claim 2, wherein training the neural network further comprises adjusting weights of the neural network to increase the likelihood that a sampling of latent vectors from the predetermined latent representation base distribution and mapping the latent vectors to transport trips by the inverse of the invertible mapping generates the transport trips of the input dataset.

8. The method of claim 1, wherein the predetermined latent representation base distribution is a multidimensional distribution.

9. The method of claim 7, wherein each latent representation is a latent vector having values for a plurality of vector components, wherein the values of each vector component are distributed according to the multidimensional distribution.

10. The method of claim 1, wherein the predetermined latent representation base distribution is a multidimensional Gaussian distribution or a multidimensional uniform distribution.

11. The method of claim 1, wherein determining the input dataset comprises determining a data point in a data point space for each transport trip of the historical data.

12. The method of claim 1, wherein mapping each of the sampled latent vectors to a respective transport trip comprises mapping the sampled latent vector to a data point in data point space.

13. The method of claim 1, wherein the predetermined latent representation base distribution depends on a parameter and sampling a latent representation from the predetermined latent representation base distribution comprises sampling a latent representation from the base distribution with the parameter set to a value for which a synthetic transport trip is to be generated.

14. The method of claim 13, wherein the parameter specifies a trip characteristic.

15. The method of claim 13, wherein the input dataset comprises a value for the parameter for each transport trip of the historical data.

16. The method of claim 1, wherein determining the control scheme comprises training a control policy using the set of synthetic transport trips.

17. The method of claim 1, wherein determining the control scheme comprises evaluating one or more predetermined control schemes using the set of synthetic transport trips.

18. The method of claim 1, wherein the transport system is configured to provide a transport service in a geographic region and controlling the transport system comprises controlling supply in the geographic region.

19. The method of claim 1, wherein controlling the transport system comprises controlling one or more vehicles to move from a sub-region of the geographic region to another sub-region of the geographic region.

20. A server computer, comprising:
a radio interface;
a memory interface; and
a processing unit configured to perform a method for controlling a transport system, the method comprising
determining an input dataset of historical data associated with transport trips performed by a transport system;
identifying a predetermined latent representation base distribution of the input dataset;
sampling a set of latent representations from the predetermined latent representation base distribution;
inputting the set of sampled latent representations into a neural network to generate a corresponding set of synthetic transport trips by performing the inverse mapping from the latent representations to transport trips;
determining a control scheme for the transport system using the set of synthetic transport trips; and
controlling the transport system using the determined control scheme.

21. A non-transitory computer-readable medium storing executable program code, the program code executable to cause a system to:
determine an input dataset of historical data associated with transport trips performed by a transport system;
identify a predetermined latent representation base distribution of the input dataset;
sample a set of latent representations from the predetermined latent representation base distribution;
input the set of sampled latent representations into a neural network to generate a corresponding set of synthetic transport trips by performing the inverse mapping from the latent representations to transport trips;
determine a control scheme for the transport system using the set of synthetic transport trips; and
control the transport system using the determined control scheme.

* * * * *